(12) United States Patent
Neveu et al.

(10) Patent No.: US 11,995,897 B2
(45) Date of Patent: May 28, 2024

(54) DEVICE FOR DETECTING THE TYPE AND THE LEVEL OF CLOTHING OF A PASSENGER OF A MOTOR VEHICLE UTILIZING A NEURAL NETWORK

(71) Applicant: Valeo Systemes Thermiques, Le Mesnil-Saint-Denis (FR)

(72) Inventors: Daniel Neveu, Le Mesnil Saint Denis (FR); Josselin Gour, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 964 days.

(21) Appl. No.: 16/622,022

(22) PCT Filed: Jun. 1, 2018

(86) PCT No.: PCT/FR2018/051270
§ 371 (c)(1),
(2) Date: Apr. 7, 2021

(87) PCT Pub. No.: WO2018/229384
PCT Pub. Date: Dec. 20, 2018

(65) Prior Publication Data
US 2021/0232834 A1    Jul. 29, 2021

(30) Foreign Application Priority Data

Jun. 16, 2017 (FR) ...................................... 1755507

(51) Int. Cl.
*G06V 20/00*     (2022.01)
*G06V 10/143*    (2022.01)
(Continued)

(52) U.S. Cl.
CPC .......... *G06V 20/597* (2022.01); *G06V 10/143* (2022.01); *G06V 20/59* (2022.01); *H04N 5/33* (2013.01)

(58) Field of Classification Search
CPC .... G06V 20/597; G06V 20/59; G06V 10/143; H04N 5/33
See application file for complete search history.

(56) References Cited

U.S. PATENT DOCUMENTS 5,145,112 A    9/1992  Ueda
5,555,512 A *  9/1996  Imai ..................... G08B 13/194
                                                        250/342

(Continued)

FOREIGN PATENT DOCUMENTS

DE    10 2013 001878 A1    8/2014
JP    2005-306095 A        11/2005

OTHER PUBLICATIONS

International Search Report and Written Opinion in corresponding International Application No. PCT/FR2018/051270, dated Aug. 30, 2018 (10 pages).

*Primary Examiner* — Pakee Fang
(74) *Attorney, Agent, or Firm* — Osha Bergman Watanabe & Burton LLP

(57) ABSTRACT

The invention concerns a device for identifying a clothing family index (Clo), the index in particular representing the type and level of clothing of a passenger of a motor vehicle, comprising: —at least one camera (2) designed to capture at least one image of a part of the clothing of the passenger (P), —a processing unit (3) designed to determine at least one clothing family index (Clo) by using a recognition algorithm based on a neural network model, trained in (Continued)

Figure 1:
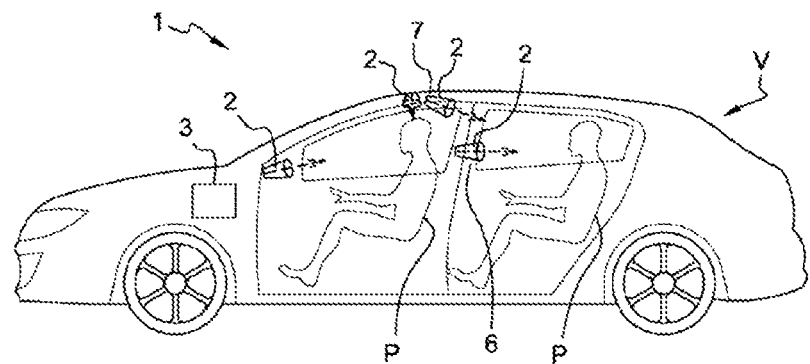

particular on a library (5) of representative images captured by the camera, images preferably categorised beforehand by a human operator.

10 Claims, 1 Drawing Sheet

(51) Int. Cl.
*G06V 20/59* (2022.01)
*H04N 5/33* (2023.01)

(56) References Cited

U.S. PATENT DOCUMENTS

| | | | |
|---|---|---|---|
| 9,082,239 B2* | 7/2015 | Ricci | G06F 16/25 |
| 2005/0131607 A1* | 6/2005 | Breed | B60R 25/255 |
| | | | 701/45 |
| 2006/0144581 A1 | 7/2006 | Kauf | |
| 2019/0156150 A1* | 5/2019 | Krishnan | G06V 40/18 |

* cited by examiner

DEVICE FOR DETECTING THE TYPE AND THE LEVEL OF CLOTHING OF A PASSENGER OF A MOTOR VEHICLE UTILIZING A NEURAL NETWORK

The invention relates to a thermal management system for a motor vehicle. The invention relates also to a thermal management method implemented by such a thermal management system.

In a motor vehicle, it is known practice to provide management of the flow rates, temperatures and distribution of the air blown by the different air vents as a function of the outside temperature and sunlight conditions. On some vehicles, that can be combined with the activation of a heating steering wheel and/or a heating or cooling seat, and sometimes contact-based heating surfaces such as an elbow rest.

The detection and/or the recognition of the thermal state of the passengers is virtually nonexistent, apart from a few examples of use of infrared sensors which detect the surface temperature of the clothing of the passengers to take better account of the initial conditions in the transitional phase of accommodation (when the person is coming from a cold or hot ambiance) and of the thermal balance resulting from the radiative and convective exchanges. Generally, the measurement of the thermal state of the car interior is limited to a measurement of air temperatures combined with a sunlight sensor.

More sophisticated approaches to management of comfort have been proposed relying on new sensors, in particular infrared cameras, and new actuators, in particular radiant panels and/or localized air intakes.

The invention aims notably to propose an enhancement to the known thermal management systems.

Notably, the present innovation targets the recognition of clothing in comfort management. It is applicable to the context of a motor vehicle but can be applied also to public transport vehicles where there is a desire to adapt the thermal comfort management parameters to the clothing of each passenger.

It is known that the clothing reduces the heat exchanges between the body and the environment and consequently modifies the equilibrium temperature of the body and of the skin, for a given metabolic activity and environment. The result thereof is a modification of the thermal sensations and of thermal comfort, bearing in mind that the comfort is for a large part correlated to the skin temperature of different parts of the body.

The thermo-physiological models which describe the thermal comfort of a person, like the Fanger model, take into account the level of clothing in the calculation of the heat exchanges. A specific unit is moreover used to characterize the level of clothing of a person: the "Clo", which represents an index of the rate of clothing, which varies typically within a typical range of 0 to 2.

The average clothing of a person, trousers with a shirt and jacket for a man, corresponds to 1 Clo. A person in bathing costume will have a clothing index of 0.1 to 0.2 Clos. A person dressed to keep in heat for skiing will have an index close to 2 Clos.

The knowledge of this clothing index makes it possible to determine the significance of the heat exchanges of the body with the external ambiance and deduce therefrom a comfort index. In the Fanger model, a budget is produced over all the body based on an overall mean temperature.

The following patent applications can be cited regarding these aspects: JP2005306095 and US2006144581.

Thus, the subject of the invention is a device for identifying a clothing family index (Clo), an index notably representative of the type and of the level of clothing of a passenger of a motor vehicle, comprising:
- at least one camera arranged to pick up at least one image of a part of the clothing of the passenger,
- a processing unit arranged to determine at least one clothing family index (Clo) by using a recognition algorithm based on a model of neural network type, notably trained over a library of representative images picked up by the camera, images preferably previously categorized by a human operator.

The advantage of such an identification method is notably dispensing with the intervention of the passengers to describe their clothing and to be able to enrich and enhance the robustness of the identification on the basis of feedback. It also makes it possible to take account of a very wide variety of situations and of types of clothing through the power of association and of classification from learning by neural network.

The artificial neural network, as system capable of learning, implements the principle of induction, that is to say learning through experience. The neutral network is generally used in problems of statistical nature, such as machine classification.

According to one aspect of the invention, the camera is a camera operating in the near infrared, notably in a band of sensitivity of radiation between 0.5 and 1 µm.

This band makes it possible to view the passengers in the day or at night, and without visual nuisance for the passengers. This camera is notably of NIR (Near Infra Red) type provided with illuminating lamps.

As a variant, the camera is a thermal infrared camera, called LWIR (Long Wave Infra-Red), operating in the 8 to 13 µm wavelength band, or a conventional visible camera, or even the images supplied by the combination of several cameras, for example an NIR camera and an LWIR camera.

According to one aspect of the invention, the position, the orientation and the viewing angle of the camera or cameras are chosen for at least a part of the clothing of the persons being analyzed to be within the field of each camera.

According to one aspect of the invention, the camera is disposed head-on facing a passenger, for example on the dashboard for the front passengers. In this case, the camera is arranged so that the clothing of the top of the body—namely typically the neck, the head and if possible the shoulders—is visible.

According to one aspect of the invention, the camera is disposed in a module, notably a dome-type module, fixed to the ceiling of the car interior. In this case, the camera is arranged to observe several persons within its field. The camera is arranged to view a part of their clothing, in particular the top part of the body.

According to one aspect of the invention, the camera is disposed in a side upright of the vehicle (this upright is also called pillar—front or center pillar). In this case, the camera is arranged to observe several persons and to view the top part of the body, notably the torso and the head, i.e. well within the field.

According to one aspect of the invention, in the case where several cameras are used, they can be disposed at the same point to observe one passenger. It is for example possible to have one camera, notably an NIR camera, facing the face of the driver, behind the steering wheel, and one camera, notably an IR camera, disposed in a dome light at the ceiling level.

According to one aspect of the invention, the images of the library are classified by clothing family.

According to one aspect of the invention, the recognition of the level of clothing from the images supplied by the camera or cameras, by using a recognition algorithm based on a model of "neural network" type which will have previously been trained over a library of representative images categorized in one or more clothing families. The model is then capable of categorizing each image received by assigning to it one or more clothing families.

According to one aspect of the invention, a clothing family is representative of a type and level of clothing. The library comprises, for example, four families for describing the clothing, for example, in terms of layers on the chest:
absence of layer, for example, bare torso: the Clo index has the value nClo1, for example equal to 0.2
light layer, for example corresponding to a tee shirt or a shirt or a singlet: the Clo index has the value nClo2, for example equal to 0.5
intermediate layer, for example corresponding to a pullover or a jacket: the Clo index has the value nClo3, for example equal to 1
a hot layer, for example corresponding to an overcoat or an anorak: the Clo index has the value nClo4, for example equal to 1.5.

According to one aspect of the invention, the number of families for the chest can lie between 2 and 6, and the number of families for the legs can lie between 2 and 4.

According to one aspect of the invention, the families for the legs are for example:
shorts
short skirt
long skirt
trousers.

According to one aspect of the invention, a family can be provided to describe accessories:
no scarf
a scarf
a bonnet
a hat.

According to one aspect of the invention, each image of the library can be categorized in several families according to the usable information.

Whatever the quality and the richness of the learning phase, it is not statistically possible to have a 100% reliable model. The invention aims to achieve a maximum of reliability by virtue of a strategy for managing the risk of error and enriching and increasing the reliability of the model. According to one aspect of the invention, the processing unit is arranged to:
determine a rate of confidence on the recognition of a family,
when this rate of confidence is above a predetermined threshold, for example a threshold of 90%, validate the clothing index without intervention from the passenger, possibly inform the passenger of the family or families selected to manage his or her comfort.

According to one aspect of the invention, if the rate of confidence is below a predetermined threshold, for example a threshold of 50%, the processing unit is arranged to require by default a validation of the choice of the family by the passenger to activate the comfort management accordingly.

According to one aspect of the invention, if the rate of confidence is within an intermediate range, between the abovementioned two thresholds, the processing unit is arranged to allow the passenger the option to modify the family if necessary.

The categorization or the correction of the families associated with new images are used, if necessary, to enrich the library of images used to train the model. An updating of the model is performed by a new learning when the library of images has been significantly modified.

According to one aspect of the invention, in the case where several cameras are used, different strategies are possible for exploiting the combination of the different cameras.

Each camera can be associated with a recognition model which is specific to it and categorize the images received independently of the other cameras.

According to one aspect of the invention, the combination of logical and statistical rules can then make it possible to generate a categorization with the highest rate of confidence, by combining the categorization and rate of confidence of each of the available cameras.

It is also possible to generate a library of images by merging the data coming from the various cameras and train the model by categorizing each situation from the images from several cameras.

When the cameras used generate a video stream with, for example, several images per second, it is possible to use images taken at various instants to categorize a passenger by exploiting the redundancy of the measurements.

According to one aspect of the invention, the processing unit can be arranged to use the model over several images taken at regular intervals, by analyzing the consistency between the different categorizations sent back and the associated rates of confidence. A statistical approach implemented by the processing unit (occurrences of a categorization with the highest cumulative rate of confidence) can make it possible to define the categorization which offers the best rate of confidence.

According to one aspect of the invention, an additional step implemented by the processing unit makes it possible to modulate the rate of confidence associated with a categorization as a function of the statistical occurrence of a family as a function of other contextual parameters.

The occurrence of each clothing family can be weighted as a function of various parameters:
the season: low occurrence "hot layer, scarf . . . " for summer; low occurrence "light layer" for winter, etc. . . .
the place: low occurrence "bare torso" if no beach or expanse of water nearby, low occurrence "scarf" if starting up in an indoor parking lot, etc. . . .

According to one aspect of the invention, the categorization is associated partly with a scale of thermal insulation of a part of the body, notably the chest or the legs, on a progressive scale from 1 to N, N notably greater than or equal to 4.

According to one aspect of the invention, the categorization retained takes account of the date, time and place of the shots taken to weight the rate of confidence assigned to each clothing family as a function of their statistical occurrence with respect to the abovementioned parameters.

According to one aspect of the invention, the processing unit is arranged to:
take account of the results obtained over several images to identify the most probative result by statistical analysis of the occurrences and rates of confidence of the results,
optionally, take account of other contextual parameters making it possible to reinforce the statistical probability of a result, such as the outside temperature or the location of the vehicle.

Another subject of the invention is a method for identifying a clothing family index (Clo), an index notably representative of the type and of the level of clothing of a passenger of a motor vehicle, comprising the following steps:
picking up at least one image of a part of the clothing of the passenger,
determining at least one clothing family index (Clo) by using a recognition algorithm based on a model of neural network type, notably trained over a library of representative images picked up by the camera, images preferably previously categorized by a human operator.

Figure 2:
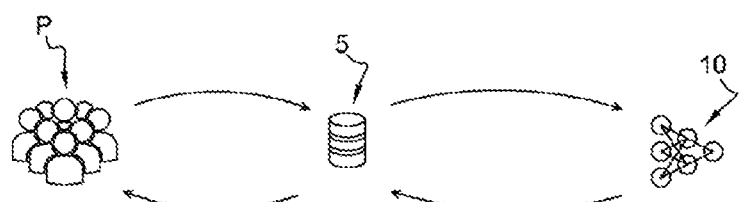
Figure 3:
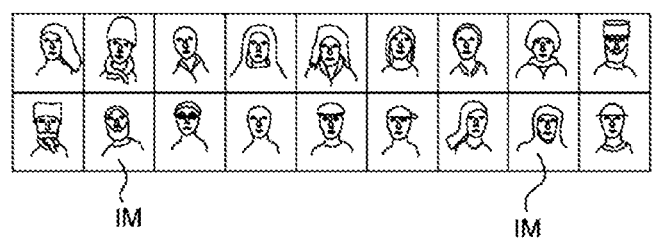

The invention will be better understood and other details, features and advantages of the invention will become apparent on reading the following description given by way of nonlimiting example with reference to the attached drawing in which:

FIG. 1 illustrates, schematically and partially, a device according to the invention, FIG. 2 illustrates exchanges of data linked with the device of FIG. 1, FIG. 3 represents photos from the library used by the device of FIG. 1.

FIG. 1 shows a device 1 for identifying a clothing family index (Clo), an index representative of the type and of the level of clothing of a passenger of a motor vehicle V, comprising:
a plurality of cameras 2 arranged to pick up images IM of a part of the clothing of a passenger P,
a processing unit 3 arranged to determine a clothing family index (Clo) by using a recognition algorithm based on a model of neural network type, linked with a library 5 of representative images IM picked up by the camera.

One of the cameras 2 is an NIR camera operating in the near infrared, notably in a band of sensitivity of radiation between 0.5 and 1 μm.

Another camera 2 is a longwave infrared, or LWIR, camera operating in the 8 to 2 μm band.

Other types of cameras can of course be used.

The position, the orientation and the viewing angle of the camera or cameras 2 are chosen for at least a part of the clothing of the persons P being analyzed to be within the field of each camera.

One of the cameras 2 is disposed head-on facing a passenger, for example on the dashboard for the front passengers. In this case, the camera is arranged so that the clothing of the top of the body—namely typically the neck, the head and if possible the shoulders—is visible.

One of the other cameras 2 is disposed in a module, notably a dome-type module, fixed to the ceiling 7 of the car interior. In this case, the camera is arranged to observe several persons P within its field. The camera is arranged to view a part of their clothing, in particular the top part of the body.

One of the other cameras is disposed in a side upright 6 of the vehicle (this upright is also called pillar—front or center pillar).

The cameras 2 can be disposed at the same point to observe one passenger. It is for example possible to have one camera, notably an NIR camera, facing the face of the driver, behind the steering wheel, and one camera, notably an IR camera, disposed in a dome light at the ceiling level.

The images of the library 5 are classified by clothing family.

As illustrated in FIG. 2, the recognition of the level of clothing from the images supplied by the camera or cameras 2, by using a recognition algorithm based on a model 10 of "neural network" type which will have previously been trained over a library of representative images 5 categorized in one or more clothing families. The model is then capable of categorizing each image received by assigning to it one or more clothing families.

A clothing family is representative of a type and level of clothing. The library 5 comprises, for example, four families for describing the clothing, for example in terms of layers on the chest:
absence of layer, for example, bare torso: the Clo index has the value nClo1, for example equal to 0.2
light layer, for example corresponding to a tee shirt or a shirt or a singlet: the Clo index has the value nClo2, for example equal to 0.5
intermediate layer, for example corresponding to a pullover or a jacket: the Clo index has the value nClo3, for example equal to 1
a hot layer, for example corresponding to an overcoat or an anorak: the Clo index has the value nClo4, for example equal to 1.5.

The number of families for the chest can lie between 2 and 6, and the number of families for the legs can lie between 2 and 4.

According to one aspect of the invention, the families for the legs are for example:
shorts
short skirt
long skirt
trousers.

According to one aspect of the invention, a family can be provided to describe accessories:
no scarf
a scarf
a bonnet
a hat.

The processing unit 3 is arranged to:
determine a rate of confidence on the recognition of a family,
when this rate of confidence is above a predetermined threshold, for example a threshold of 90%, validate the clothing index without intervention from the passenger,
possibly inform the passenger of the family or families selected to manage his or her comfort.

According to one aspect of the invention, if the rate of confidence is below a predetermined threshold, for example a threshold of 50%, the processing unit is arranged to require by default a validation of the choice of the family by the passenger to activate the comfort management accordingly.

According to one aspect of the invention, if the rate of confidence is within an intermediate range, between the abovementioned two thresholds, the processing unit is arranged to allow the passenger the option to modify the family if necessary.

Each camera can be associated with a recognition model which is specific to it and categorize the images received independently of the other cameras.

According to one aspect of the invention, the combination of logical and statistical rules can then make it possible to generate a categorization with the highest rate of confidence, by combining the categorization and rate of confidence of each of the available cameras.

It is also possible to generate a library of images by merging the data coming from the various cameras and train the model by categorizing each situation from the images from several cameras.

When the cameras used generate a video stream with, for example, several images per second, it is possible to use images taken at various instants to categorize a passenger by exploiting the redundancy of the measurements.

An additional step implemented by the processing unit makes it possible to modulate the rate of confidence associated with a categorization as a function of the statistical occurrence of a family as a function of other contextual parameters.

The invention claimed is:

1. A device for identifying a clothing family index, an index representative of the type and of the level of clothing of a passenger of a motor vehicle, comprising:
    at least one camera arranged to pick up at least one image of a part of the clothing of the passenger; and
    a processing unit arranged to:
        determine at least one clothing family index by using a recognition algorithm based on a model of neural network type, trained over a library of representative images picked up by the camera and previously categorized by a human operator,
        determine a rate of confidence on the recognition of the at least one clothing family,
        when the rate of confidence is above a predetermined threshold of 90%, validate the clothing index without intervention from the passenger, and
        inform the passenger of the clothing family or families selected to manage his or her comfort.

2. The device as claimed in claim 1, the camera being a camera operating in the near infrared in a band of sensitivity of radiation between 0.5 and 1 µm.

3. The device as claimed in claim 1, the camera being a thermal infrared camera operating in the 8 to 13 µm wavelength band, or a conventional visible camera.

4. The device as claimed in claim 1, wherein the camera is arranged so that the clothing of the top of the body comprising the neck, the head and the shoulders is visible.

5. The device as claimed in claim 1, the images of the library being classified by clothing family.

6. The device as claimed in claim 1, the library comprising four families for describing the clothing in terms of layers on the chest:
    absence of layer, corresponding to a bare torso: the Clo index has the value nClo1, equal to 0.2,
    light layer, corresponding to a tee shirt or a shirt or a singlet: the Clo index has the value nClo2, equal to 0.5,
    intermediate layer, corresponding to a pullover or a jacket: the Clo index has the value nClo3, equal to 1, and
    a hot layer, corresponding to an overcoat or an anorak: the Clo index has the value nClo4, equal to 1.5.

7. The device as claimed in claim 1, the number of clothing families for the chest lying between 2 and 6, and the number of clothing families for the legs lying between 2 and 4.

8. The device as claimed in claim 6, the clothing families for the legs are: shorts, short skirt, long skirt, and trousers.

9. The device as claimed in claim 1, at least one further clothing family being provided to describe accessories selected from the group consisting of: no scarf, a scarf, a bonnet, and a hat.

10. The device as claimed in claim 1, wherein the images are supplied by a combination of cameras comprising a NIR camera and an LWIR camera.

* * * * *